(12) United States Patent
True et al.

(10) Patent No.: US 9,656,541 B2
(45) Date of Patent: May 23, 2017

(54) SELF-CONTAINED ELECTRIC AXLE FOR ALL-WHEEL DRIVE

(71) Applicant: BorgWarner Inc., Auburn Hills, MI (US)

(72) Inventors: Ryan M. True, Rochester Hills, MI (US); Christopher J. Kowalsky, Windsor (CA)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/848,796

(22) Filed: Sep. 9, 2015

(65) Prior Publication Data

US 2016/0068053 A1    Mar. 10, 2016

Related U.S. Application Data

(60) Provisional application No. 62/048,331, filed on Sep. 10, 2014.

(51) Int. Cl.
| | |
|---|---|
| *B60K 6/52* | (2007.10) |
| *B60K 6/442* | (2007.10) |

(Continued)

(52) U.S. Cl.
CPC .............. *B60K 6/442* (2013.01); *B60K 6/48* (2013.01); *B60K 6/52* (2013.01); *B60K 17/34* (2013.01); *B60L 11/002* (2013.01); *B60L 11/18* (2013.01); *B60W 10/02* (2013.01); *B60W 2510/081* (2013.01); *B60W 2710/021* (2013.01); *B60Y 2200/10* (2013.01); *B60Y 2300/42* (2013.01); *B60Y 2300/52* (2013.01); *B60Y 2400/206* (2013.01); *B60Y 2400/303* (2013.01); *B60Y 2400/82* (2013.01); *Y02T 10/6234* (2013.01); *Y02T 10/6265* (2013.01);

(Continued)

(58) Field of Classification Search
CPC .............. B60K 6/52; B60K 2007/0038; B60K 2007/0092; B60K 17/28; B60K 17/354
USPC ....................................................... 180/65.51
See application file for complete search history.

(56) References Cited

U.S. PATENT DOCUMENTS

| | | | | |
|---|---|---|---|---|
| 5,495,906 A | * | 3/1996 | Furutani ................ | B60K 6/442 180/242 |
| 5,788,005 A | * | 8/1998 | Arai ....................... | B60K 6/52 180/247 |

(Continued)

*Primary Examiner* — Jeffrey J Restifo
(74) *Attorney, Agent, or Firm* — Young Basile Hanlon & MacFarlane, P.C.

(57) ABSTRACT

A driveline (12) of a motor vehicle having an internal combustion engine (10) for propelling the vehicle and method of assembly can include a self-contained drive axle assembly (35). The self-contained drive axle assembly (35) can include an electric motor (18) for propelling the motor vehicle mounted coaxial with and sheathing a first portion of the drive axle assembly (35) and a disconnect clutch (20) mounted coaxial with and sheathing a second portion of the drive axle assembly (35) for selectively connecting powered rotation between the electric motor (18) and a gear box (14). The drive axle assembly (35) can include the gear box (14) having at least one of a transmission (15) and a power take off unit (40) mounted coaxial with and sheathing a third portion of the drive axle assembly (35) for transferring powered rotation to a pair of wheels (16a, 16b) through the drive axle assembly (35).

15 Claims, 1 Drawing Sheet

(51) Int. Cl.
  *B60K 17/34* (2006.01)
  *B60L 11/00* (2006.01)
  *B60L 11/18* (2006.01)
  *B60W 10/02* (2006.01)
  *B60K 6/48* (2007.10)
(52) U.S. Cl.
  CPC ........ *Y02T 10/7005* (2013.01); *Y10S 903/916* (2013.01); *Y10S 903/93* (2013.01); *Y10S 903/946* (2013.01)

(56) References Cited

U.S. PATENT DOCUMENTS

| | | | | |
|---|---|---|---|---|
| 5,839,535 A * | 11/1998 | Arai | ........................ | B60K 6/48 180/197 |
| 5,984,034 A * | 11/1999 | Morisawa | ................ | B60K 6/48 180/65.28 |
| 6,334,498 B1 * | 1/2002 | Morisawa | ................ | B60K 6/48 180/65.25 |
| 6,349,782 B1 * | 2/2002 | Sekiya | ..................... | B60K 6/48 180/197 |
| 6,419,040 B2 * | 7/2002 | Kitano | ..................... | B60K 6/52 180/243 |
| 6,540,642 B2 * | 4/2003 | Tabata | ..................... | B60K 6/48 180/65.25 |
| 6,726,593 B2 * | 4/2004 | Yamamoto | ............... | B60K 6/48 180/65.25 |
| 7,296,648 B2 * | 11/2007 | Tatara | ..................... | B60K 6/44 180/242 |
| 7,497,285 B1 * | 3/2009 | Radev | ..................... | B60K 6/26 180/65.225 |
| 7,703,565 B2 * | 4/2010 | Ikenoya | ................... | B60G 3/20 180/65.51 |
| 8,100,216 B2 * | 1/2012 | Bartilson | ................. | B60K 6/46 180/309 |
| 8,479,851 B2 * | 7/2013 | Mack | ..................... | H02K 7/003 180/65.1 |
| 8,485,289 B2 * | 7/2013 | Drum | ..................... | B60B 35/12 180/62 |
| 8,541,915 B2 * | 9/2013 | Burns | ..................... | H02K 5/20 310/54 |
| 8,727,052 B2 * | 5/2014 | Drum | ..................... | B60B 35/16 180/55 |
| 9,371,061 B2 * | 6/2016 | Kim | ......................... | B60T 7/18 |
| 2004/0200648 A1 * | 10/2004 | Tarasinski | ................ | B60K 6/46 180/65.7 |
| 2005/0107198 A1 * | 5/2005 | Sowul | ...................... | B60K 1/00 475/5 |
| 2006/0124374 A1 * | 6/2006 | Katada | .................... | B60K 6/52 180/233 |
| 2007/0126236 A1 * | 6/2007 | Tamura | .................... | F01P 9/06 290/40 C |
| 2008/0011531 A1 * | 1/2008 | Cole | ........................ | B60K 1/02 180/65.51 |
| 2008/0179116 A1 * | 7/2008 | Ikenoya | ................... | B60G 3/20 180/63 |
| 2009/0186734 A1 * | 7/2009 | Perkins | .................. | B60K 6/365 475/5 |
| 2009/0250273 A1 * | 10/2009 | Reed | ........................ | B60K 1/02 180/65.6 |
| 2009/0250274 A1 * | 10/2009 | Reinhart | .................. | B60K 1/02 180/65.6 |
| 2009/0255746 A1 * | 10/2009 | Boesch | .................. | B60K 6/365 180/197 |
| 2010/0108417 A1 * | 5/2010 | Gilmore | ................. | B60K 6/448 180/65.51 |
| 2010/0155161 A1 * | 6/2010 | Corradini | ................. | B60K 3/04 180/65.22 |
| 2010/0224430 A1 * | 9/2010 | Bennett, Sr. | ........... | B60K 6/485 180/65.51 |
| 2010/0292901 A1 * | 11/2010 | Ortmann | ................ | B60K 6/365 701/67 |
| 2011/0276241 A1 * | 11/2011 | Nakao | .................... | B60K 6/445 701/69 |
| 2012/0118652 A1 * | 5/2012 | Yamamoto | ............... | B60K 6/52 180/65.6 |
| 2012/0203416 A1 * | 8/2012 | Yoshimura | ............. | B60K 6/445 701/22 |
| 2012/0258831 A1 * | 10/2012 | Knoblauch | .............. | B60K 1/02 475/5 |
| 2012/0292978 A1 * | 11/2012 | Buschjohann | ....... | B60G 21/051 301/6.5 |
| 2015/0129345 A1 * | 5/2015 | Suzuki | .................... | B60K 6/24 180/292 |
| 2016/0068053 A1 * | 3/2016 | True | ........................ | B60K 6/442 180/242 |
| 2016/0075224 A1 * | 3/2016 | Miu | ........................ | B60K 6/48 180/65.25 |

* cited by examiner

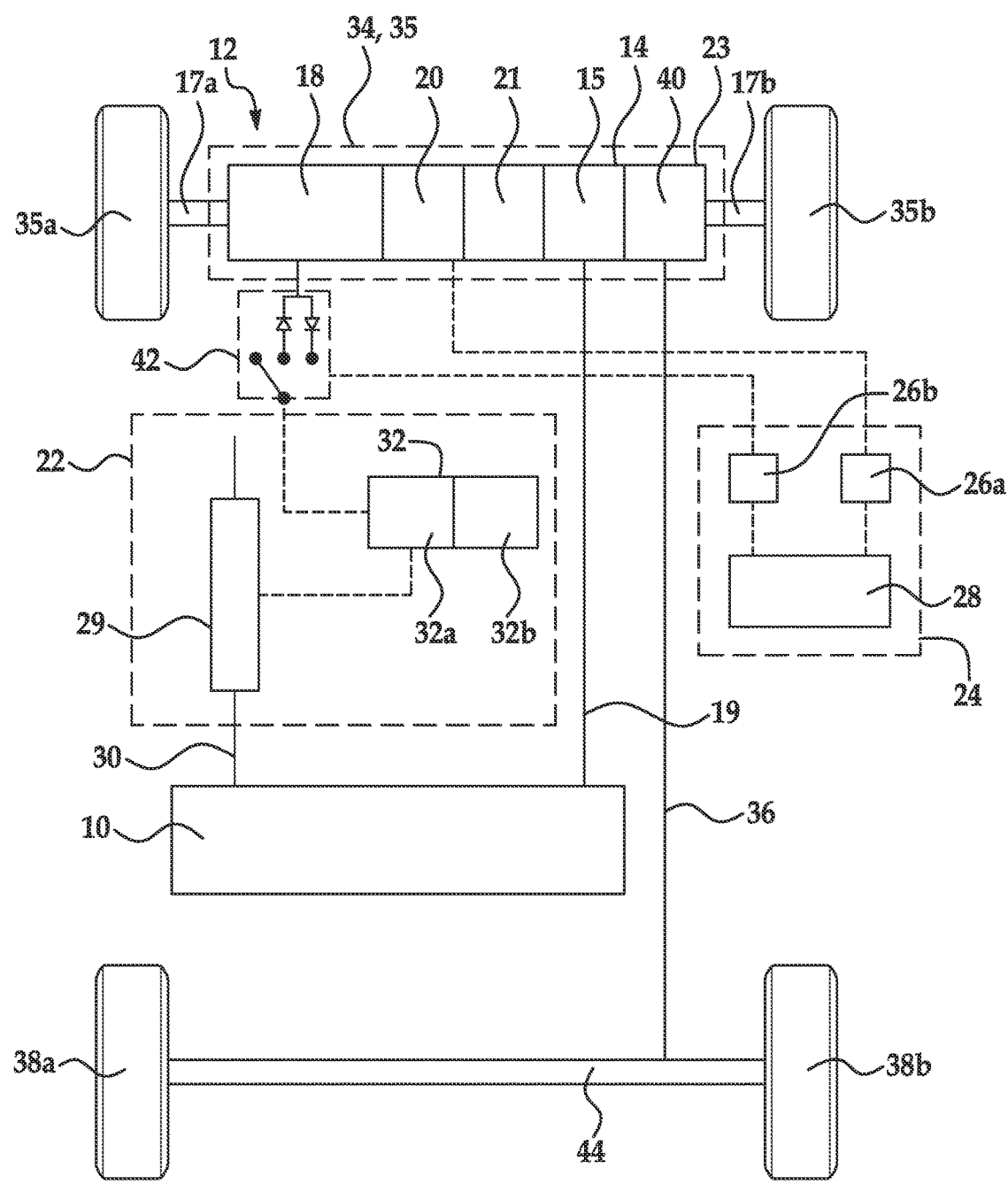

SELF-CONTAINED ELECTRIC AXLE FOR ALL-WHEEL DRIVE

CROSS-REFERENCE TO RELATED APPLICATIONS

This application claims priority to U.S. Provisional Patent Application Ser. No. 62/048,331, filed Sep. 10, 2014.

FIELD OF THE INVENTION

The invention relates to hybrid drive systems for motor vehicles, and more specifically, to an integrated electric motor and axle assembly for use in hybrid motor vehicles.

BACKGROUND

Known motor vehicles can include an internal combustion engine and an electrical drive apparatus, e.g. an electric motor, as primary sources of power for propelling the motor vehicle. Operation of the vehicle can additionally include a hybrid source of power based on an interaction between the internal combustion engine and the electrical drive apparatus. Known hybrid powertrains generally do not perform or handle as well as comparable vehicles powered by an internal combustion engine due to energy lost during normal operation of the vehicle. Many known hybrid powertrains are used on two-wheel drive vehicles to drive a single axle of a vehicle due to focus on efficient and economical operation. In an all-wheel drive vehicle, rotational input is applied to a second axle driving a second pair of wheels by a second electric drive machine and a first or front axle driving a first pair of wheels is driven by the powertrain. Energy convertors and various powertrains have been disclosed in U.S. Pat. No. 7,854,278; U.S. Pat. No. 7,836,992; U.S. Pat. No. 7,398,841; U.S. Pat. No. 7,040,186; and U.S. Pat. No. 6,699,151. All-wheel drive hybrid vehicles have been disclosed in U.S. Pat. No. 7,921,949; U.S. Pat. No. 7,464,779; U.S. Pat. No. 6,880,664; U.S. Pat. No. 6,595,308; and U.S. Pat. No. 6,205,379.

SUMMARY

Hybrid powertrains dissipate waste energy in the form of hot exhaust gases during normal operation. It can be desirable to provide an energy conversion apparatus to recover the waste energy and convert the waste energy into useable energy for more efficiently powering the vehicle. It can also be desirable to provide a gear box acting as an interface between a first and second pair of wheels in the all-wheel drive vehicle for reducing the amount of torque needed to be generated by the electric motor in order to drive both drivelines. It can further be desirable to provide a disconnect mechanism for disconnecting the electric motor from a gearbox transferring torque between wheels of the vehicle to prevent over speed rotation of the electric motor. Disconnecting the gear box from the electric motor can allow the gear box and the electric motor to rotate independently to reduce drag. An all-wheel drive vehicle can include a self-contained electric axle and power generation system using energy lost during normal operation of the vehicle, such as exhaust heat or regenerative braking. The power generation system can be operated independently from the vehicle power system and can include a mechanical system, power system, and a control system.

A motor vehicle having an internal combustion engine for propelling the motor vehicle while dissipating waste energy during operation can include a driveline for transferring torque between at least one pair of wheels. The driveline can have a self-contained drive axle including an electric motor, a disconnect clutch, and a gear box. The electric motor can propel the motor vehicle and can be mounted coaxial with and sheathing a first portion of the drive axle assembly. The disconnect clutch can be mounted coaxial with and sheathing a second portion of the drive axle assembly for selectively connecting powered rotation between the electric motor and the gear box. The gear box can include at least one of a transmission and a power take off unit and can be mounted coaxial with and sheathing a third portion of the drive axle assembly for transferring powered rotation to the at least one pair of wheels through the drive axle assembly.

An all-wheel drive motor vehicle can have an internal combustion engine for propelling the motor vehicle while dissipating waste energy during operation. The all-wheel drive motor vehicle can include a first driveline for transferring torque between at least one pair of wheels, a second driveline for transferring torque between a second pair of wheels, a power supply system, and a control system. The first driveline can include a self-contained drive axle assembly having an electric motor for propelling the motor vehicle mounted coaxial with and sheathing a first portion of the drive axle assembly, a disconnect clutch mounted coaxial with and sheathing a second portion of the drive axle assembly for selectively connecting powered rotation between the electric motor, and a gear box including at least one of a transmission and a power take off unit. The gear box can be mounted coaxial with and sheathing a third portion of the drive axle assembly. The power take off unit can transfer powered rotation to the at least one pair of wheels through the drive axle assembly and from the first driveline to the second driveline. The power supply system can recover waste energy dissipated by the motor vehicle during normal operation, convert the waste energy to electrical energy for rotating the electric motor, and store the converted energy until needed. The control system can have at least a first and second vehicle sensor and an electronic control unit. The first vehicle sensor can detect a rotary speed of the electric motor and the electronic control unit can selectively control the disconnect clutch when the rotary speed detected by the first vehicle sensor exceeds a threshold speed. The second vehicle sensor can detect operating characteristics of the motor vehicle and the electronic control unit can selectively control actuation of the electric motor in response to the second vehicle sensor.

Assembling a driveline in a motor vehicle can include assembling a self-contained drive axle assembly. The method can include mounting an electric motor for propelling the motor vehicle coaxial with and sheathing a first portion of the drive axle assembly. The method can further include connecting a disconnect clutch mounted coaxial with and sheathing a second portion of the drive axle assembly for selectively connecting powered rotation between the electric motor and a gear box. The method can further include positioning the gear box having at least one of a transmission and a power take off unit. The gear box can be mounted coaxial with and sheathing a third portion of the drive axle assembly for transferring powered rotation to at least one pair of wheels through the drive axle assembly.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings, wherein like-referenced numerals refer to like parts throughout the several views, and wherein:

FIG. 1 is a schematic view of a motor vehicle having an internal combustion engine for propelling the motor vehicle and a driveline for transferring torque between a pair of wheels, showing a self-contained drive axle assembly of the driveline having an electric motor for propelling the motor vehicle mounted coaxial with and sheathing a first portion of the drive axle assembly, a disconnect clutch mounted coaxial with and sheathing a second portion of the drive axle assembly for selectively connecting powered rotation between the electric motor, and a gear box having a transmission and a power take off unit mounted coaxial with and sheathing a third portion of the drive axle assembly for transferring powered rotation to the pair of wheels through the drive axle.

DETAILED DESCRIPTION

Referring now to FIG. 1, a motor vehicle can have an internal combustion engine 10 for propelling the motor vehicle while dissipating waste energy during operation and a driveline 12 for transferring torque between at least one pair of wheels 16a, 16b. The motor vehicle can have a first driveline 12 driving the first pair of wheels 16a, 16b and a second driveline 36 driving a second pair of wheels 38a, 38b. The motor vehicle can be operable in an all-wheel drive mode such that rotary power is transferred from the first driveline 12 to the second driveline 36. The first driveline 12 can include a first axle assembly 34 connecting the first pair of wheels 16a, 16b. The first driveline 12 can include a self-contained drive axle assembly 35 for driving the first pair of wheels 16a, 16b. The first axle assembly 34 can include the self-contained drive axle assembly 35. The first axle assembly 34 can also include a first differential connecting a pair of half axle shafts 35a, 35b. Each of the pair of half axle shafts 35a, 35b can be drivingly connected to a corresponding one of the first pair of wheels 16a, 16b. The second driveline 36 can include a second axle assembly 44 connecting the second pair of wheels 38a, 38b. The second axle assembly 44 can include a second differential for connecting the second pair of wheels 38a, 38b through a second pair of half axle shafts.

The self-contained drive axle assembly 35 can include an electric drive apparatus, or electric motor 18, for propelling the motor vehicle. The electric motor 18 can be mounted coaxial with the drive axle assembly 35 between each of the first pair of wheels 16a, 16b. The electric motor 18 can sheath a first portion of the drive axle assembly 35. The self-contained drive axle assembly 35 can further include a disconnect clutch 20 mounted coaxial with and sheathing a second portion of the drive axle assembly 35 and a gear box 14 mounted coaxial with and sheathing a third portion of the drive axle assembly 35. The disconnect clutch 20 can selectively connect powered rotation between the electric motor 18 and the gear box 14. The gear box 14 can include at least one of a transmission 15 and a power take off unit 40. The transmission 15 can transfer powered rotation from the electric motor 18 and/or a drive shaft 19 of the internal combustion engine to the first pair of wheels 16a, 16b through the drive axle assembly 35 and a transmission clutch assembly 21. In an all-wheel drive motor vehicle having a first and second driveline 12, 36, the power take off unit 40 can transfer rotary power from the first driveline 12 to the second driveline 36 when the motor vehicle is in an all-wheel drive mode. The internal combustion engine 10 can deliver drive torque to the first axle assembly 34 through the transmission 15 of the gear box 14. The electric motor 18, disconnect clutch 20, and gear box 14 can be located in a housing 23 of the self-contained drive axle assembly 35 and mounted for driving rotation of the first differential between each of the first pair of wheels 16a, 16b. By way of example and not limitation, the housing 23 can include different housing unit portions, such that the different housing unit portions can include one portion enclosing the electric motor 18, one portion enclosing the disconnect clutch 20, and one portion enclosing the gear box 14, where the different housing unit portions can be combined and connected with respect to one another into the self-contained drive axle assembly 35.

By way of example and not limitation, the gear box 14 can include a planetary gear assembly for controlling drive torque transferred from the internal combustion engine 10 and the electric motor 18 through the first differential connecting the pair of half axle shafts 35a, 35b to each of the first pair of wheels 16a, 16b. The planetary gear assembly can include a configuration of a sun gear, a ring gear, and a plurality of planetary gears rotatably supported by a planetary gear carrier. Planetary gear assemblies are generally known in the art, and are considered to be within the level of those skilled in the art, and therefore require no further explanation here. The disconnect clutch 20 can selectively connect the electric motor 18 and the gear box 14. By way of example and not limitation, at least one output shaft rotatable by the electric motor 18 can rotate the sun gear of the planetary gear assembly within the gear box 14 to provide drive torque to the first pair of wheels 16a, 16b. By way of example and not limitation, the ring gear can be held stationary and the rotation of the rotor shaft and the sun gear can cause the plurality of planetary gears to rotate and drive the planetary gear carrier at a reduced speed. The planetary gear carrier can drive the first differential connecting half axle shafts 35a, 35b. Power can be transferred through a configuration of pinions and side gears, as known by those skilled in the art, to half axle shafts 35a, 35b for driving each of the first pair of wheels 16a, 16b.

The driveline 12 can further include a power supply system 22 for recovering waste energy discharged by the internal combustion engine 10, converting the waste energy to electrical energy for rotating the electric motor 18, and storing the electrical energy. The power supply system 22 can recover waste energy dissipated during normal operation of the motor vehicle and can convert the waste energy to electrical energy. The power supply system 22 can then store the electrical energy in a power store 32. The power supply system 22 can include a thermoelectric generator 29 recovering waste exhaust heat energy from an exhaust line 30 of the internal combustion engine 10. The power store 32 can have at least one of a battery pack 32a and a capacitor 32b. The electric motor 18 can be in electrical communication with the power store 32 through a control switch 42 connecting the electric motor 18 and the at least one of the battery pack 32a and capacitor 32b. The driveline 12 can further include a control system 24 having at least one vehicle sensor 26a, 26b for detecting operating characteristics of the motor vehicle and an electronic control unit 28. The electronic control unit 28 can control actuation of the electric motor 18, actuation of the disconnect clutch 20, and operation of the power supply system 22 based on a control program stored in memory in response to the vehicle sensor 26a, 26b. The electronic control unit 28 can include a microcomputer having a central processing unit, random-access memory, read-only memory, and an input-output actuator interface. By way of example and not limitation, the at least one vehicle sensor 26a, 26b can include an accelerator position sensor, brake status switch, power store temperature sensor, power store state of charge sensor, engine speed sensor, motor speed sensor, and drive shaft speed sensor which can sense the speed of the driveshaft 19 driven by the internal combustion engine 10 for transferring rotary power to the first axle assembly 34.

The at least one vehicle sensor 26a, 26b can include a first vehicle sensor 26a for detecting a rotary speed of the electric motor 18. The control unit 28 can disengage the disconnect clutch 20 when the rotary speed detected by the first vehicle sensor 26a exceeds a threshold speed such that the electric motor 18 and the gear box 14 can rotate independently with respect to one another when the disconnect clutch 20 is disengaged. The control system 24 can include a second vehicle sensor 26b in electronic communication with the switch 42 where the electronic control unit 28 can switch the switch between a charging position, a discharging position, and an isolation position in response to the vehicle sensor 26b. The charging position can be defined by the power supply system 22 recovering energy from the electric motor 18, the discharging position can be defined by the power supply system 22 delivering electrical power to the electric motor 18, and the isolation position can be defined by the power supply system isolated with respect to the electric motor 18.

In operation, the motor vehicle can be operable in one of an internal combustion engine mode, an electric mode, and a hybrid mode. The internal combustion engine mode can be defined by the internal combustion engine 10 solely propelling the motor vehicle, and the electric mode can be defined by the electric motor 18 solely propelling the motor vehicle. The hybrid mode can be defined by the combination of the internal combustion engine 10 and the electric motor 18 propelling the vehicle. The motor vehicle can be shifted between the modes selectively by a vehicle driver or automatically by the control system 24 depending on various vehicle operating conditions, including by way of example and not limitation, vehicle speed, accelerator demand, and battery charge status. The engine 10 can be operable on any type or kind of fuel, such as gasoline, diesel, hydrogen, ethanol, biodiesel, or any other suitable fuels or combination of fuels.

When the vehicle is operating in the electric mode or hybrid mode, the control system 24 can selectively switch the switch 42 in response to the vehicle sensor 26b. The at least one vehicle sensor 26b can detect an electric potential of the electric motor 18. If the vehicle sensor 26b detects that the electric potential of the electric motor 18 is greater than an electric potential of the power store 32, the electronic control unit 28 can switch the switch 42 into the charging position, such that the power supply system 22 can recover energy from the electric motor 18. If the vehicle sensor 26b detects that the electric potential of the electric motor 18 is less than the electric potential of the power store 32, the electronic control unit 28 can switch the switch 42 into the discharging position, such that the power supply system 22 can deliver electrical power to the electric motor 18 to propel the vehicle. When the motor vehicle is operating at a slower speed and a driver desires to brake the rotating wheels, the electric motor 18 continues to rotate while being propelled by the inertia of the vehicle and the switch 42 is placed in the charging position to generate drag acting against the continued rotation of the wheels corresponding to movement of the vehicle. The rotation of the electric motor 18 acts as drag against rotation of the wheels, or regenerative braking, and creates a high electric potential in the electric motor 18 to be recovered and stored in the power store 32.

When the vehicle is operating in the internal combustion engine mode and the electric motor 18 is not propelling the vehicle, the switch 42 can be switched into the isolation position. In the internal combustion engine mode, the electric motor 18 can be back-driven by the rotation of the first pair of wheels 16a, 16b. When the vehicle sensor 26a detects the electric motor 18 is rotating faster than a threshold speed, the disconnect clutch 20 can be actuated by the electronic control unit 28 for selectively disconnecting the electric motor 18 and the gear box 14. When the disconnect clutch 20 is disengaged, the electric motor 18 and the gear box 14 can rotate independently such that rotary power is not transferred from the first pair of wheels 16a, 16b to the electric motor 18. Disconnecting the electric motor 18 and the gear box 14 can prevent over speed rotation of the electric motor 18 and reduces drag within the driveline 12. When the motor vehicle is propelled by the internal combustion engine 10 in the engine mode and the hybrid mode, the thermoelectric generator 29 of the power supply system 22 can recover waste exhaust heat energy from the exhaust line 30 and convert the exhaust heat energy to electrical energy for rotating the electric motor 18. The thermoelectric generator 29 can be configured as known by one skilled in the art. The converted electrical energy can then be stored in the power store 32 until the electronic control unit 28 switches the switch 42 into the discharging position for rotating the electric motor 18.

A driveline 12 can be assembled in a motor vehicle. The method can include assembling a self-contained drive axle assembly 35. Assembling the self-contained drive axle assembly 35 can include mounting an electric motor 18 for propelling the motor vehicle coaxial with and sheathing a first portion of the drive axle assembly 35, connecting a disconnect clutch 20 mounted coaxial with and sheathing a second portion of the drive axle assembly 35 for selectively connecting powered rotation between the electric motor 18 and a gear box 14 and positioning the gear box 14. The gear box 14 can include at least one of a transmission 15 and a power take off unit 40 and can be mounted coaxial with and sheathing a third portion of the drive axle assembly 35 for transferring powered rotation to at least one pair of wheels 16a, 16b through the drive axle assembly 35.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a motor vehicle having an internal combustion engine (10) for propelling the motor vehicle while dissipating waste energy during operation and a driveline (12) for transferring torque between at least one pair of wheels (16a, 16b), the improvement of the driveline (12) comprising:
   a self-contained drive axle assembly (35) extending between a first pair of wheels (16a, 16b) including:
      an electric motor (18) for propelling the motor vehicle mounted coaxial with and sheathing a first portion of the drive axle assembly (35);

a disconnect clutch (20) mounted coaxial with and sheathing a second portion of the drive axle assembly (35) and connected to the electric motor (18) for selectively connecting powered rotation of the electric motor (18) for transferring torque to the first pair of wheels (16a, 16b); and a gear box (14) connected to the disconnect clutch (20) and including at least one of: a transmission (15) and a power take off unit (40), the gear box mounted coaxial with and sheathing a third portion of the drive axle assembly (35) for selectively transferring powered rotation from the internal combustion engine (10), the electric motor (18), and a combination of the internal combustion engine (10) and the electric motor (18) to the first pair of wheels (16a, 16b) through the drive axle assembly (35).

2. The improvement of claim 1 further comprising:
a power supply system (22) for recovering waste energy discharged by the internal combustion engine (10), converting the waste energy to electrical energy for rotating the electric motor (18), and storing the electrical energy.

3. The improvement of claim 2 further comprising:
the power supply system (22) having a thermoelectric generator (29) recovering waste exhaust heat energy from an exhaust line (30) of the internal combustion engine (10) and converting the waste exhaust heat energy to electrical energy.

4. The improvement of claim 2 further comprising:
a control system (24) having at least one vehicle sensor (26a, 26b) for detecting operating characteristics of the motor vehicle and an electronic control unit (28) controlling actuation of the electric motor (18), actuation of the disconnect clutch (20), and operation of the power supply system (22) based on a control program stored in memory in response to the vehicle sensors (26a, 26b).

5. The improvement of claim 4, wherein the at least one vehicle sensor (26a, 26b) further comprises:
a vehicle sensor (26a) for detecting a rotary speed of the electric motor (18); and
wherein the electronic control unit (28) disengages the disconnect clutch (20) when the rotary speed detected by the first vehicle sensor (26a) exceeds a threshold speed, the electric motor (18) and the gear box (14) rotatable independently with respect to one another when the disconnect clutch (20) is disengaged.

6. The improvement of claim 2, wherein the power supply system (22) further comprises:
a power store (32) having at least one of a battery pack (32a) and a capacitor (32b).

7. The improvement of claim 6 further comprising:
a switch (42) connecting the electric motor (18) and the at least one of a battery pack (32a) and a capacitor (32b);
a vehicle sensor (26b) in electronic communication with the switch (42); and
a control system (24) having at least one vehicle sensor (26a, 26b) for detecting operating characteristics of the motor vehicle and an electronic control unit (28) controlling actuation of the electric motor (18), actuation of the disconnect clutch (20), and operation of the power supply system (22) based on a control program stored in memory in response to the vehicle sensors (26a, 26b), wherein the electronic control unit (28) switches the switch (42) between a charging position, a discharging position, and an isolation position in response to the vehicle sensor (26b), the charging position defined by the power supply system (22) recovering energy from the electric motor (18), the discharging position defined by the power supply system (22) delivering electrical power to the electric motor (18), and the isolation position defined by the power supply system isolated with respect to the electric motor (18).

8. The improvement of claim 1, wherein the motor vehicle is operable in one of an electric mode, a hybrid mode, and an internal combustion engine mode, the electric mode defined by the electric motor (18) solely propelling the motor vehicle, the hybrid mode defined by a combination of the electric motor (18) and internal combustion engine propelling the motor vehicle, the internal combustion engine mode defined by the internal combustion engine (10) solely propelling the motor vehicle.

9. The improvement of claim 1, wherein the motor vehicle further comprises:
a first driveline (12) driving a first pair of wheels (16a, 16b) and having a first axle assembly (34) connecting the first pair of wheels (16a, 16b);
a second driveline (36) driving a second pair of wheels (38a, 38b) and having a second axle assembly (44) connecting the second pair of wheels (38a, 38b); and
wherein the gear box (14) includes the power take-off unit (40) for transferring rotary power from the first driveline (12) to the second driveline (36) when the motor vehicle is in an all-wheel drive mode.

10. An all-wheel drive motor vehicle having an internal combustion engine (10) for propelling the motor vehicle while dissipating waste energy during operation, the all-wheel drive motor vehicle comprising:
a first driveline (12) for transferring torque between a first pair of wheels (16a, 16b), the first driveline (12) including a self-contained drive axle assembly (35) including an electric motor (18) for propelling the motor vehicle mounted coaxial with and sheathing a first portion of the drive axle assembly (35), a disconnect clutch (20) mounted coaxial with and sheathing a second portion of the drive axle assembly (35) for selectively connecting powered rotation of the electric motor (18), and a gear box (14) connected to the disconnect clutch (20), the gear box including a transmission (15) and a power take off unit (40), the gear box mounted coaxial with and sheathing a third portion of the drive axle assembly (35), the transmission for selectively transferring powered rotation from the internal combustion engine (10), the electric motor (18), and a combination of the internal combustion engine (10) and the electric motor (18) through the drive axle assembly (35), the power take off unit (40) for transferring powered rotation from the drive axle assembly (35);
a second driveline (36) for transferring torque between a second pair of wheels (38a, 38b), the power take off unit (40) transferring rotary power from the first driveline (12) to the second driveline (36);
a power supply system (22) for recovering waste energy dissipated by the motor vehicle during normal operation, converting the waste energy to electrical energy for rotating the electric motor (18), and storing the electrical energy; and
a control system (24) having at least a first and second vehicle sensor (26a, 26b) and an electronic control unit (28), the first vehicle sensor (26a) for detecting a rotary speed of the electric motor (18) and the electronic control unit (28) for selectively controlling the disconnect clutch (20) when the rotary speed detected by the first vehicle sensor (26*a*) exceeds a threshold speed, the second vehicle sensor (26*b*) detecting operating characteristics of the motor vehicle and the electronic control unit (28) for selectively controlling actuation of the electric motor (18) in response to the second vehicle sensor (26*b*).

11. The all-wheel drive motor vehicle of claim 10, wherein the all-wheel drive motor vehicle is operable in one of an electric mode, a hybrid mode, and an internal combustion engine mode, the electric mode defined by the electric motor (18) solely propelling the motor vehicle, the hybrid mode defined by a combination of the electric motor (18) and the internal combustion engine propelling the motor vehicle, and the internal combustion engine mode defined by the internal combustion engine (10) solely propelling the motor vehicle.

12. The all-wheel drive motor vehicle of claim 10 further comprising:
the power supply system (22) having a thermoelectric generator (29) recovering waste exhaust heat energy from an exhaust line (30) of the internal combustion engine (10) and converting the heat energy to electrical energy.

13. The all-wheel drive motor vehicle of claim 10, wherein the power supply system (22) further comprises:
at least one of a battery pack (32*a*) and a capacitor (32*b*).

14. The all-wheel drive motor vehicle of claim 13 further comprising:
a switch (42) connecting the electric motor (18) and the at least one of a battery pack (32*a*) and a capacitor (32*b*);
the second vehicle sensor (26*b*) in electronic communication with the switch (42); and
the electronic control unit (28) switching the switch (42) between a charging position, a discharging position, and an isolation position in response to the vehicle sensor (26*b*), the charging position defined by the power supply system (22) recovering energy from the electric motor (18), the discharging position defined by the power supply system (22) delivering electrical power to the electric motor (18), and the isolation position defined by the power supply system isolated with respect to the electric motor (18).

15. A method of assembling a driveline (12) for a motor vehicle comprising:
assembling a self-contained drive axle assembly (35) to be connected extending between a first pair of wheels (16*a*, 16*b*) including:
mounting an electric motor (18) coaxial with and sheathing a first portion of the drive axle assembly (35) for propelling the motor vehicle;
connecting a disconnect clutch (20) coaxial with and sheathing a second portion of the drive axle assembly (35) for selectively connecting powered rotation between the electric motor (18) and a gear box (14); and
positioning the gear box (14) including a transmission (15) and a power take off unit (40) coaxial with and sheathing a third portion of the drive axle assembly (35), the transmission for selectively transferring powered rotation to the first pair of wheels (16*a*, 16*b*) through the drive axle assembly (35), the power take off unit (40) for transferring powered rotation from the drive axle assembly (35).

* * * * *